Sept. 19, 1950 T. J. COMBER 2,523,195
TENT
Filed Nov. 13, 1946 4 Sheets-Sheet 1
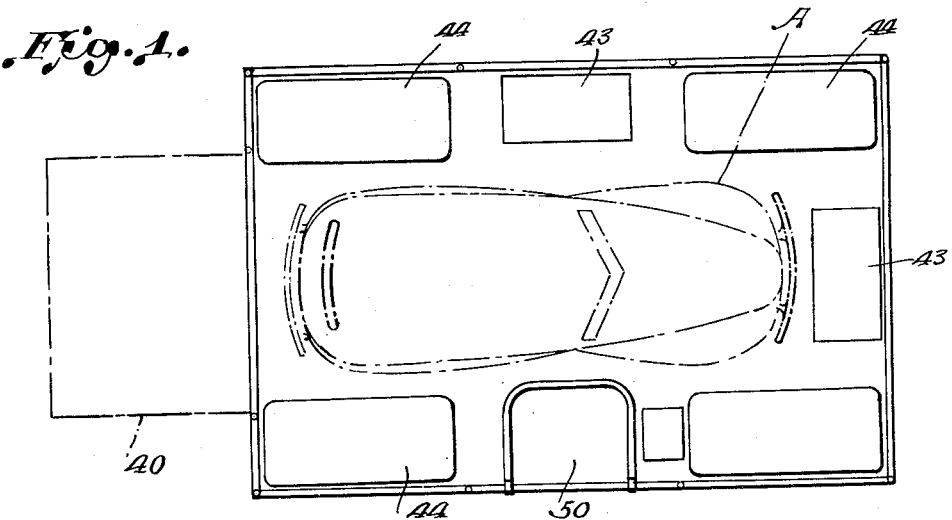
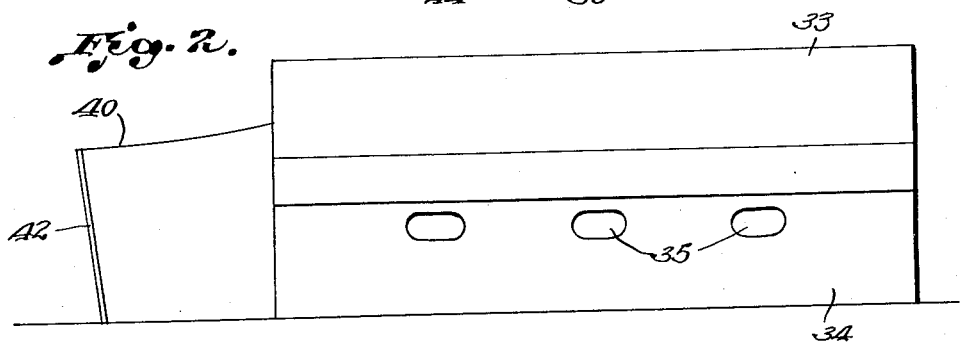
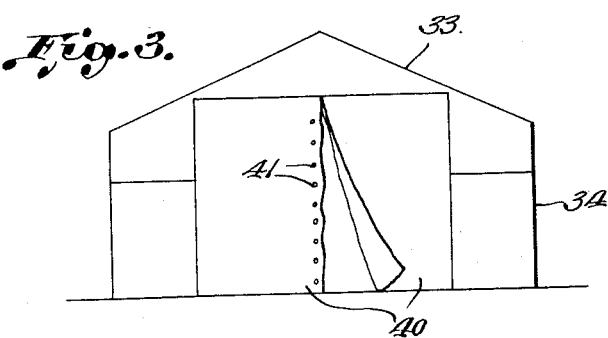
Inventor
Thomas J. Comber
By Cyrus Kehr & Snicker
Attorney

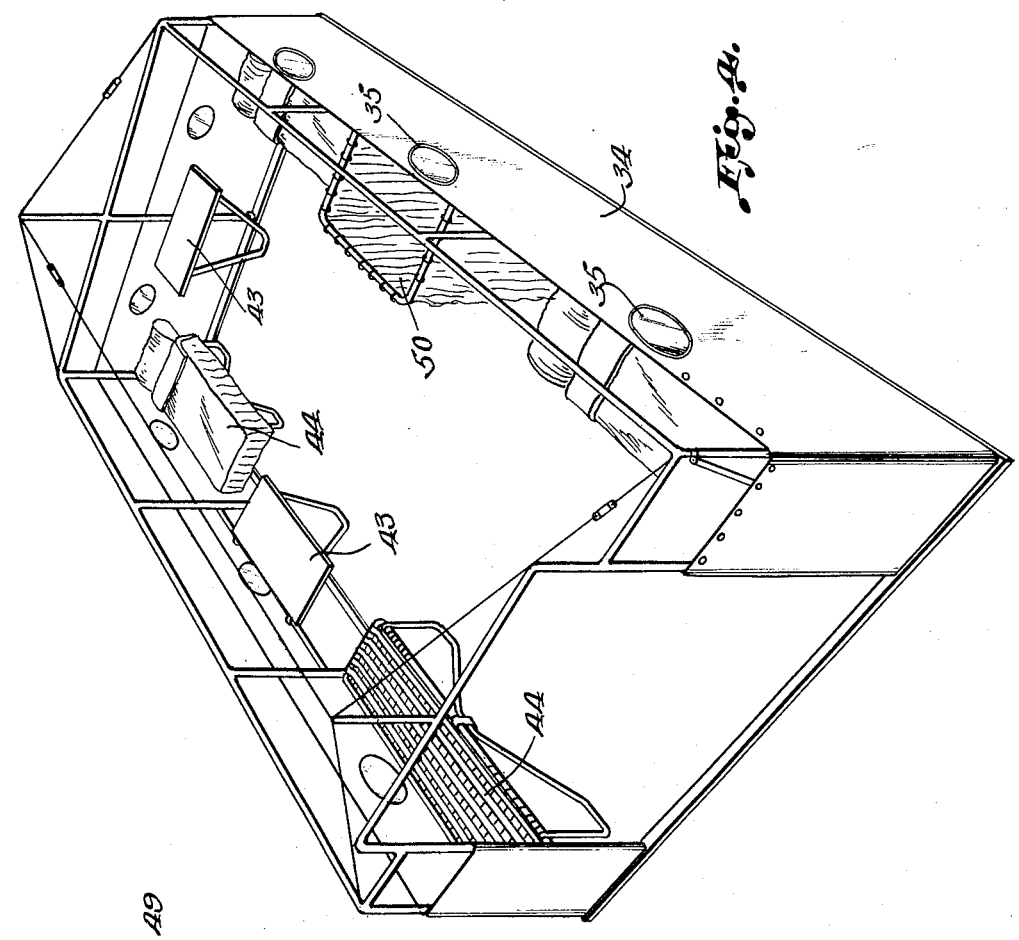

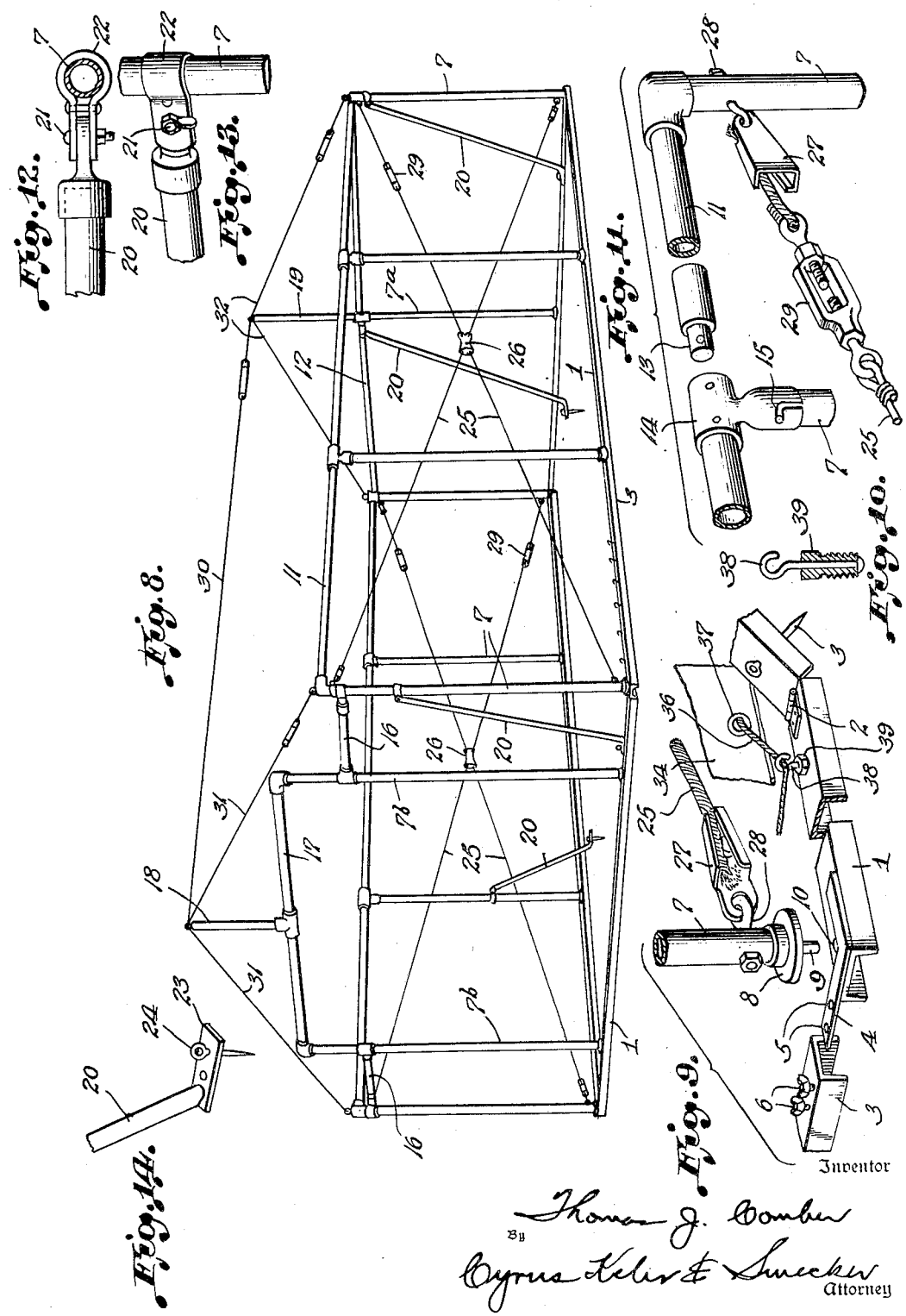

Sept. 19, 1950 T. J. COMBER 2,523,195
TENT
Filed Nov. 13, 1946 4 Sheets-Sheet 4
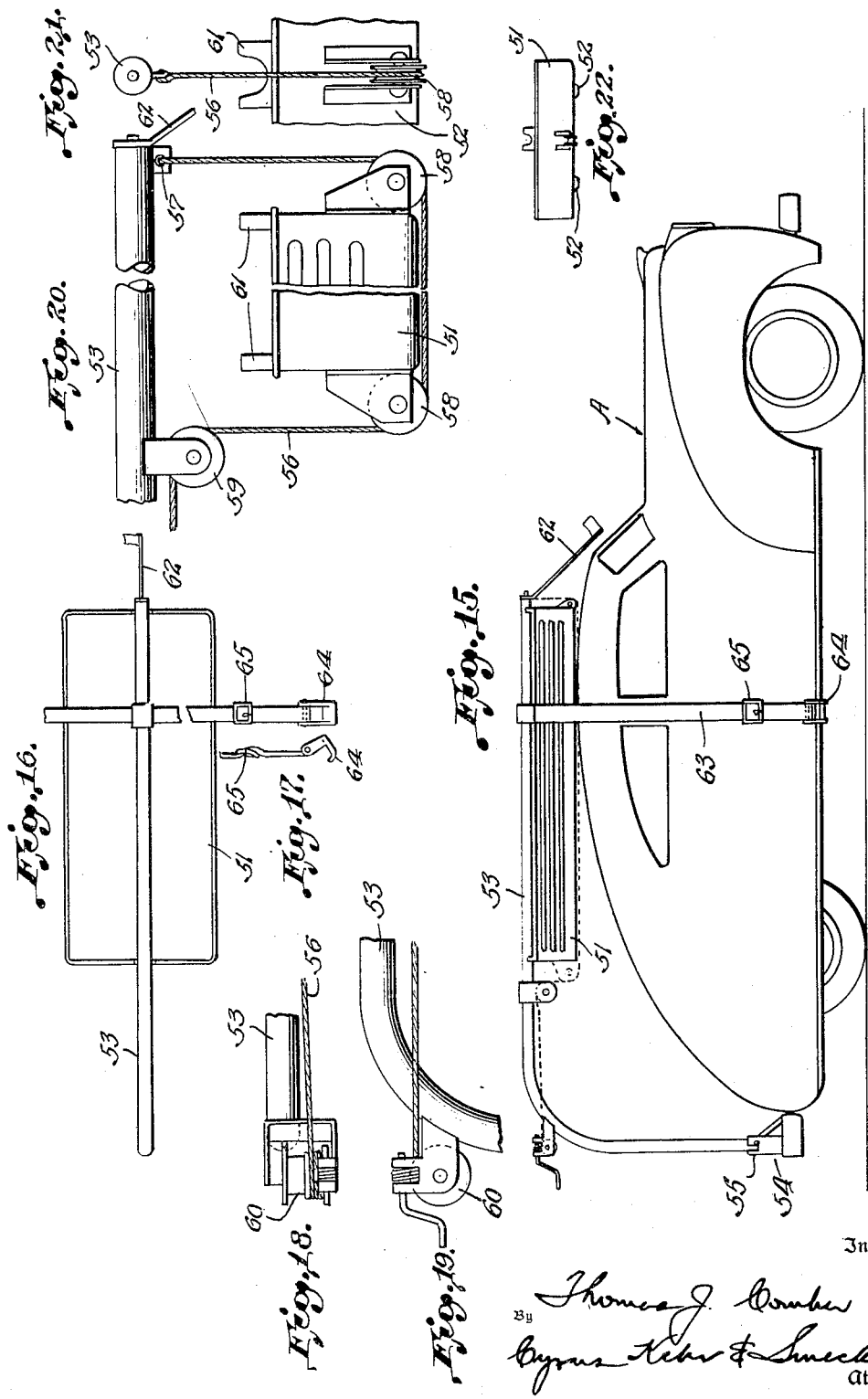

Patented Sept. 19, 1950

2,523,195

UNITED STATES PATENT OFFICE 2,523,195

TENT

Thomas J. Comber, Knoxville, Tenn.

Application November 13, 1946, Serial No. 709,591

4 Claims. (Cl. 135—3)

This invention relates to improvements in tents and, particularly, of the character adapted for transportation on an automobile, together with a collapsible framework, which may be set up readily by the user in a camping position and capable of being used where desired and then repacked and transported on the automobile from place to place, as desired.

The object of the invention is to improve the construction of tents adapted for this purpose, to provide a sturdy and rigid structure, to simplify the construction, so as to permit this to be assembled readily and set up for use and yet permitting it to be disassembled and packed for transportation in a compact unit that may be mounted directly on an automobile in a carrying position.

This object may be accomplished by providing a foundation frame which may be laid directly on the ground and upon which is supported an upstanding frame structure over which canvas may be stretched and secured to provide the body of the tent. The parts of the structure are capable of ready assembly in a simple and expeditious manner and yet when the frame structure is set up, the canvas body of the tent is held securely in place thereon. The frame structure preferably, is braced by tie connections and angle braces, if desired, which will hold the parts in assembled upright positions and form a rigid support for the body of the tent.

The structure may be made sufficiently large, if desired, not only to accommodate sleeping quarters for the user, but also to form an enclosure to receive the automobile by means of which it is transported. At the same time, the frame structure on which the canvas is mounted may be used to support and hold in place beds, tables, and other camping facilities, as may be desired.

The invention is illustrated in one embodiment in the accompanying drawings in which:

Fig. 1 is a top plan view of the frame structure of the tent showing diagrammatically the assembly of camping facilities therein;

Fig. 2 is a side elevation of the tent complete;

Fig. 3 is an end elevation thereof;

Fig. 4 is a perspective view of the tent showing the top covering removed;

Fig. 5 is a top plan view of one of the berths;

Fig. 6 is an end elevation thereof extended and showing the frame attachment;

Fig. 7 is a similar view of the berth in folded position;

Fig. 8 is a perspective view of the frame structure with the covering removed;

Fig. 9 is a dissassembled perspective view of a corner portion of the frame structure;

Fig. 10 is a vertical section through one of the swiveled connections;

Fig. 11 is a disassembled perspective view of another portion of the frame structure;

Fig. 12 is a top plan view of one of the brace connections for the frame;

Fig. 13 is a side elevation thereof;

Fig. 14 is a perspective view of the lower end of a frame brace;

Fig. 15 is a side elevation of an automobile showing the tent in carrying position thereon;

Fig. 16 is a top plan view of the tent structure in collapsed carrying relation;

Fig. 17 is a detail side elevation of one of the strap connections;

Fig. 18 is a plan view of the boom and cable winding device;

Fig. 19 is a side elevation thereof;

Fig. 20 is a detail side elevation of a portion of the boom and supporting basket;

Fig. 21 is an end elevation thereof; and

Fig. 22 is a similar view showing the complete basket.

The tent is composed of a frame structure upon which suitable covering material may be secured to form an enclosure within which suitable living provisions may be made. The frame structure preferably comprises a foundation or base upon which upstanding frame members are mounted.

Referring to Figs. 4, 8 and 9, the foundation or base is shown as formed of sills, generally indicated at 1, extending longitudinally and transversely of the tent. These sills may extend throughout the length and width thereof, if desired, or made in sections, preferably hinged together at 2 (Fig. 9) to be folded upon each other for compact assembly. In the form illustrated, each of the sills or base members is shown as formed of a channel section, although other suitable materials or shapes may be provided, as desired. Openings may be provided through the base members at intervals therealong, if desired, through which pins 3 may be driven to secure the base members in place, the pins being driven into the earth to the required extent.

In the form illustrated, the longitudinal and transverse sections of the base members 1 are disposed substantially at right angles to each other and preferably are detachably connected as by means of an angle bar 4, which is shown as welded to the longitudinal base member and detachably connected with the transverse base member, although this may be varied as desired. This angle member 4 has openings 5 therein for detachable connection with bolts 6, extending through the transverse base member to permit separation of these parts for disassembly or to secure them rigidly together when desired.

The base members 1 are assembled preferably to form a rectangular frame at the bottom of the tent which extends continuously around the periphery thereof. When desired, one end of the tent may be left open to form a doorway for an automobile, in which event the end base member may be separated at this point, although the height of the base member will not be so great as to interfere with the movement of the vehicle thereover, if it extends continuously across the entrance opening.

The supporting frame of the tent is composed of a plurality of upstanding columns 7, spaced at intervals around the base frame 1. The number and disposition of these columns may be varied, as desired, according to the size and nature of the tent as well as the character of the covering to be applied thereto. In the form of the invention illustrated in which the tent is formed with a hip roof and also with an entrance doorway for an automobile, provision is made for supporting the center portion of the roof at an elevated position by a central column 7a at the back of the tent, and by laterally spaced front columns 7b, which form opposite sides of the doorway.

Each of the columns 7, 7a and 7b is detachably mounted on the base frame 1, as shown in Fig. 9. The lower end of the column has a surrounding plate 8 thereon, seated upon the base frame 1, and with a depending pin 9 engaged in an orifice 10, in the upper surface of the base member 1, upon which the column is mounted. This forms a sturdy and rigid support for the columns while permitting these to be detachable from the base for disassembly of the tent.

At opposite sides of the frame structure are side rails 11 formed in sections that extend throughout the distance between the spaced side columns and similar connecting bars are shown at 12, across the back of the tent. Each of these bars has the sections thereof detachably connected together as by plugs 13, inter-engaging fittings 14 (see Fig. 11), which parts may be pinned together through holes provided therein. The fitting 14 in turn has a detachable connection 15 with the corresponding upright column 7 or 7a, to provide a quickly detachable connection therebetween as shown in Fig. 11.

At the front of the tent, the columns 7 and 7b are connected together through section 16. A frame 17 is mounted upon the upper ends of the columns 7b and connects these together. The frame 17 also supports a ridge column 18 of a height corresponding with a ridge column 19 at the back of the tent, and which latter forms a continuation of the back column 7a to support the center portion of the tent.

These columns and frame members are shown and preferably formed of tubular members or pipe sections and are detachably connected together as described either by the plug and socket 13—14 or the bayonet joint 15, for ready disassembly or reassembly. However, it is preferred that the frame 16—18 and the frame 12, 19 remain in one piece unless of too great length for convenience of transportation.

The upright columns may be braced at suitable intervals, as desired, by braces, such as are shown at 20 and 20'. Each of the braces 20 and 20' may be secured to a column 7, 7a or 7b, in the manner shown in Figs. 12 and 13, by having the upper end thereof swiveled at 21 to a clamp 22 that surrounds the column. As will be seen from a study of Fig. 12, the clamp 22 freely surrounds the column 7 in such a way as to permit longitudinal adjustment on the column and also swinging of the clamp around the column. Such an arrangement permits both lateral and vertical adjustment of the clamp 22. The lower end of each brace is shown as provided with a foot 23 welded thereto, and having one or more perforations through which a pin 24 may be inserted and driven into the ground to secure the brace in proper position for holding the column rigidly in upright position.

The end columns at opposite sides of the tent are shown as connected together through cables 25 arranged in crossed relation. The intermediate portions of these cables are connected together by clips 26. Each of these cables may be formed of wire or rope or other suitable material that will serve as an effective brace for the frame structure. Clips 27 (Figs. 9 and 11) secure the opposite ends of the cables 25 to hooks 28, attached to the corresponding columns 7. Each of the cables may be provided, if desired, with suitable tightening means, such as the turnbuckle 29 shown as disposed intermediate the length thereof.

The top portion of the tent is shown as formed of corresponding cables one of which is indicated at 30, extending between the upper ends of the standards 18 and 19, while respective end cables are shown at 31 and 32, extending downwardly from the upper ends of the standards 18 and 19, respectively, to the adjacent corner columns 7. These cables 30—32 may be provided also with tightening means, such as the turn-buckle of the character shown at 29.

The covering of the tent may be of any suitable or desired material, such as is used ordinarily for the purpose and preferably is detachably secured upon the frame structure. This is formed ordinarily of canvas and is illustrated as being in two sections shown in Figs. 2 and 3. The upper section is designated at 33 and extends over the top portion of the tent while a lower section 34 extends around the sides thereof. The lower section 34 is shown as formed with windows 35 therethrough as indicated in Figs. 2 and 4, which windows may be formed of glass or of suitable transparent material. The sections 33 and 34 may be secured together by suitable fastenings 34' (Fig. 4), such as buttons, snaps, etc.

The lower section 34 is shown as secured to the base 1, by lacing 36 (Fig. 9) extending through grommets 37 spaced at intervals along the lower edge of the canvas section 34 and through swiveled hooks or eyelets 38, secured to the base frame 1. The swiveled hooks or eyelets are journaled in supporting studs 39 mounted at intervals along the base frame 1, as shown in Figs. 9 and 10. The lacing 36 extends alternately through one of the hooks or eyelets 38 and the grommets 37 and serves to secure the lower edge of the canvas in place.

At the doorway provided at the front end of the tent, flaps are shown at 40, detachably connected together by fastenings 41 (Fig. 3) to enable these to hang downward and either to be disconnected as shown in Fig. 3, to form an entranceway for the tent, or to be raised jointly and held by supports 42 extending upwardly beside the doorway as desired.

The interior of the tent may be provided with any suitable or desired living facilities, such as tables 43 and berths 44, spaced at intervals around the wall of the tent. Each of the tables and berths is shown as mounted on a swiveled connection 45 upon the side columns 7 of the frame, as shown in Fig. 6. The swiveled connection 45 is shown as provided by brackets 46, attached to the adjacent columns and supporting therein by upstanding yokes 47, within which are journaled horizontal rod members of the table or bed, whereby the latter may be lowered to the position as shown in Fig. 6, or raised flat against the wall as indicated in Fig. 7. When in its lowered position, the table or bed is supported on a U-shaped leg 48, which is hinged thereto.

Each of the berths is formed preferably of crossed straps generally as indicated at 49 in Fig. 5. The straps 49 preferably are secured together to form a flexible or yieldable support which serves as the surface of the bed.

As shown also in Figs. 1 and 4, an enclosure may be provided, if desired, as indicated at 50, which may form a shower bath or for other purpose, as desired.

The tent structure may be disassembled by the removal of the canvas from the frame structure which may be folded into compact relation after which the parts of the frame may be disconnected from each other by the detachable connections described above. These parts may then be assembled in compact relationship for transportation or storage. Thereafter, the base members 1 are disconnected and folded into compact relationship. The parts are sufficiently detachable, so as to be assembled for transportation and yet when assembled, as shown and described, a tent is provided of substantial size.

As shown in Fig. 1, the tent may be sufficiently large, if desired, to form an enclosure for the automobile generally indicated at A, thereby protecting the vehicle while providing adequate living facilities therearound which are suitably spaced and disposed for ample accommodations.

When the parts are disassembled, they may be packed into a cage or basket, generally indicated at 51, which may be open at the top and may be provided with suction cups 52 (Fig. 22), at the under surface thereof to secure said cage to the top of the automobile A, as shown also in Fig. 15.

The basket 51 is shown as supported on a boom 53, which is mounted on a special fitting 54 carried by the rear bumper of the automobile A and connected with the fitting through a bayonet joint 55. This permits the boom 53 to be supported rigidly on the bumper when turned lengthwise of the vehicle and yet to be disconnected therefrom when moved on the fitting 54 to a position at right angles to that shown in the drawings.

The basket 52 is supported on the boom 53, by a cable 56, one end of which is anchored to the end of the boom as at 57 and extends therefrom beneath sheaves 58, journaled at the opposite ends of the basket 52, thence over a sheave 59 journaled on the boom. The extreme end of the cable 56 is secured to a windlass, generally indicated at 60, mounted on the boom 53 and adapted for manual operation. Thus the basket 52 may be drawn up to the boom 53 and supported thereon when turned to proper position over the top of the automobile, or lowered to the ground from the boom when the latter is moved laterally relative to the automobile. Yokes 61 are shown as secured to opposite ends of the basket 52 to embrace the boom when the basket is in carried position with respect thereto.

At the forward end, the boom 53 is shown as provided with a signal indicator, such as a small flag, generally indicated at 62, projecting downward over the windshield of the vehicle, so the operator thereof will be informed, in the event that the boom should swing in one direction or the other out of its carrying position.

Normally the boom is retained in place by straps or flexible members 63, attached to the boom and extending downwardly in opposite directions therefrom on opposite sides of the automobile. The lower ends of the straps 63 are provided with retaining hooks 64 (Figs. 15 to 17) for engaging under the lower edges of the vehicle to anchor the lower ends of the straps thereto. Each of the straps may be provided with a tightening buckle 65, if desired, to insure a taut condition thereof.

While the invention has been illustrated and described in one embodiment, it is recognized that variations and changes may be made therein, without departing from the invention, except as specified in the claims.

I claim:

1. In a tent, a base frame adapted to be laid on the ground, an upright frame supported by the base frame, a covering of flexible material extending about the upright frame, said flexible material having a plurality of grommets therein, upright supporting studs fixed to the base frame, a hook having a shank swiveled in each stud, and a flexible lacing member extending through the grommets and hooks and connecting the covering with the base frame.

2. In a tent, a rectangular base frame adapted to be seated upon the ground, upright columns mounted on the base frame at the corners thereof and upstanding therefrom, a rectangular top frame carried upon said upright columns, upright standards carried upon two opposite sides of said top frame, a cable connected from the top of said standards to each of the adjacent corners of the top frame, and a ridge cable connecting the tops of the standards together.

3. In a tent, a rectangular base frame adapted to be seated upon the ground, upright columns mounted on the base frame at the corners thereof and upstanding therefrom, flexible bracing members extending diagonally of said columns spaced from each other, said bracing members extending from the base of one column to the top of the column located at the opposite end of the same side, and means forming detachable connections of said flexible members with the columns, said means comprising a clip embracing one end of the bracing member having a hole in one end thereof, and a hook connected with the column and engaging in the hole of the clip.

4. In a tent, a base frame adapted to be seated upon the ground, upright columns mounted on the base frame at the corners thereof and upstanding therefrom, flexible bracing means extending diagonally of said bracing members from the base of one column to the top of the column located at the opposite end of the same side, and means forming detachable connections of said flexible members with the columns, said means comprising a clip secured to the flexible means and having means for detachably engaging the columns.

THOMAS J. COMBER.

(References on following page)

REFERENCES CITED

The following references are of record in the file of this patent:

UNITED STATES PATENTS

| Number | Name | Date |
|---|---|---|
| 514,726 | Ormsby | Feb. 13, 1894 |
| 622,993 | Chamberlain | Apr. 11, 1899 |
| 651,251 | Karr | June 5, 1900 |
| 655,693 | Dempster | Aug. 14, 1900 |
| 1,009,783 | Padley | Nov. 28, 1911 |
| 1,052,960 | Rasmussen | Feb. 11, 1913 |
| 1,124,263 | Bemis | Jan. 12, 1915 |
| 1,253,776 | Brewer | Jan. 15, 1918 |
| 1,286,190 | Purcell | Nov. 26, 1918 |
| 1,314,758 | Schiffmacher | Sept. 2, 1919 |
| 1,347,107 | McCann | July 20, 1920 |
| 1,708,979 | Usher | Apr. 16, 1929 |
| 1,778,815 | Scrivner et al. | Oct. 21, 1930 |
| 1,828,656 | Handler | Oct. 20, 1931 |
| 1,940,147 | Sankus | Dec. 19, 1933 |
| 1,961,915 | Salmen, Jr. | June 5, 1934 |
| 2,180,032 | Casley | Nov. 14, 1939 |
| 2,363,917 | Waterman et al. | Nov. 28, 1944 |
| 2,395,173 | Dobler | Feb. 19, 1946 |
| 2,444,695 | Crites | July 6, 1948 |